Jan. 27, 1953  DE LOSS D. WALLACE ET AL  2,626,503
HYDRAULIC PUMP AND MOTOR POWER SYSTEM
Filed July 25, 1951
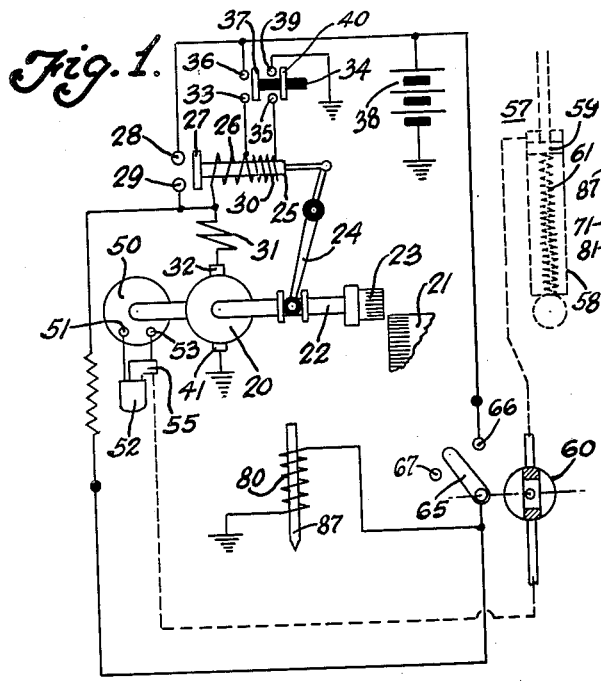
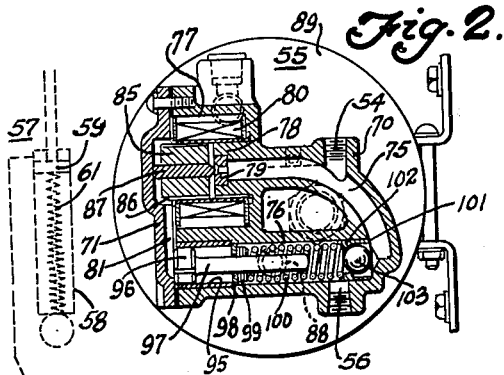
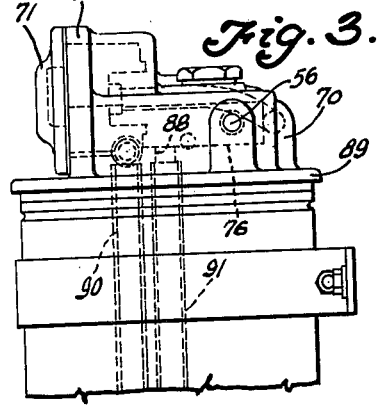
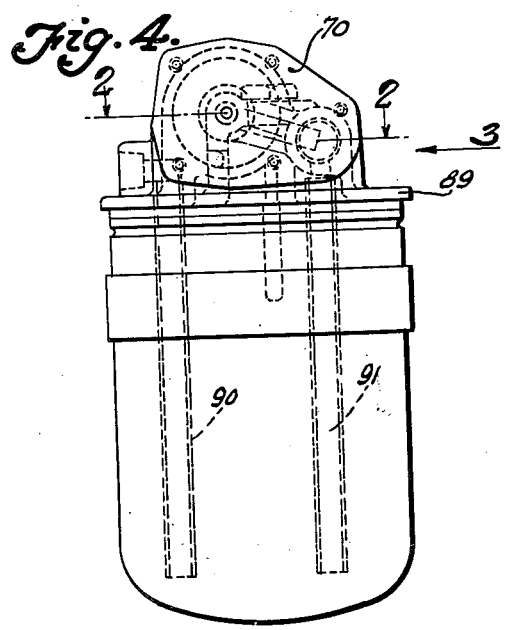
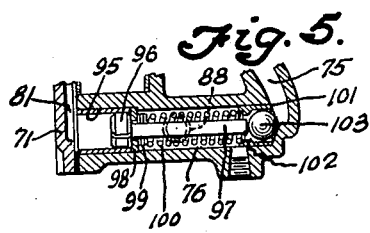
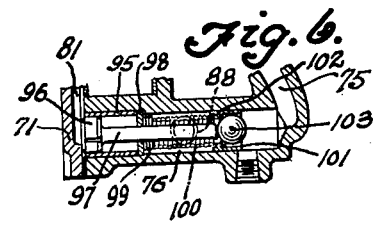
INVENTORS
DE LOSS D. WALLACE AND
WILLIAM F. ERICKSON
BY
THEIR ATTORNEYS Patented Jan. 27, 1953

2,626,503

UNITED STATES PATENT OFFICE 2,626,503

HYDRAULIC PUMP AND MOTOR POWER SYSTEM

De Loss D. Wallace and William F. Erickson, Dayton, Ohio, assignors to General Motors Corporation, Detroit, Mich., a corporation of Delaware Application July 25, 1951, Serial No. 238,562

8 Claims. (Cl. 60—52)

This invention relates to a hydraulic power system including a fluid pressure pump and a fluid actuated motor.

Some automobiles are equipped with hydraulically actuated mechanism for raising and lowering the windows and the top of the vehicle. The actual raising and lowering operation, especially with the windows, is performed by a fluid motor operated in one direction by fluid pressure and in the opposite direction by a spring. A fluid pressure pump, communicating with a fluid reservoir, provides the fluid pressure to actuate the motor. In some installations a separate motive power is used to drive the pump and in others, the electric starting motor, primarily used to start the engine of the vehicle, has the pump connected thereto so as to be driven thereby. In the latter instance the pump is actuated whenever the starting motor operates and consequently it is necessary to provide arrangements so that the pump may be operated idly or without delivering fluid pressure to the fluid motor while the electric motor acts to start the engine and so that the electric motor may be actuated to drive the pump for window actuating purposes without the engine being cranked by said electric motor.

It is therefore among the objects of the present invention to provide a fluid pressure pump with a control device which, when the electric motor is energized to crank the engine and at the same time drive the pump, will set up fluid circuits permitting the fluid delivered by the pump to be idly circulated between the pump and reservoir thereby relieving fluid pressure.

A further object of the present invention is to provide a control device for a fluid pump, which, when said pump is being driven by the electric motor free of the engine, sets up fluid flow circuits through which fluid under pressure from the pump is delivered to the fluid motor for actuating it.

A still further object of the present invention is to provide the control device with mechanism cooperating to set up fluid circuits again to establish idling fluid circulation between the pump and fluid reservoir in response to an excess of fluid pressure beyond a predetermined operating degree.

Further objects and advantages of the present invention will be apparent from the following description, reference being had to the accompanying drawing, wherein a preferred embodiment of the present invention is clearly shown.

In the drawing:

Fig. 1 is a diagrammatic view primarily illustrating the electrical circuits of an installation utilizing the present invention.

Fig. 2 is a transverse sectional view taken substantially along the line and in the direction of the arrows 2—2 in Fig. 4.

Fig. 3 is a side view of the unitary mechanism providing the pump, the reservoir and the fluid flow control device of the present invention. The view is taken in the direction of the arrow 3 appearing in Fig. 4.

Fig. 4 is a view of the unitary mechanism shown in Fig. 3, taken, however, from another side thereof.

Fig. 5 is a fragmentary sectional view of elements of the control mechanism in a position differing from that shown in Fig. 2.

Fig. 6 is a view similar to Fig 5, the elements being shown in a still different position, however.

Referring to the drawing, Fig. 1 shows electrical devices and circuits used to operate the motor 20 for cranking the engine, only a portion of its flywheel 21 being illustrated. The motor 20 has a rotatable shaft 22 upon which a pinion 23 is shiftably keyed so as to be movable to mesh with teeth on the flywheel 21. The pivoted lever 24 shifts the pinion 23 on shaft 22. Lever 24 is actuated by an armature 25 movable longitudinally by a magnet winding 26 and held so that the bridging contact 27 engages stationary terminals 28 and 29, by a holding magnet winding 30. One end of magnet winding 26 and terminal 29 are connected to one end of the motor field winding 31 also connected to the motor brush 32. The other end of winding 26 as well as one end of winding 30 are connected to terminal 33 of the motor starting switch 34. The other end of winding 30 is connected to terminal 35 of switch 34. The terminal 36, connectible with terminal 33 by the bridging element 37 of switch 34, is connected to one side of the battery 38 as is the terminal 28. Terminal 39 of switch 34, connectible with terminal 35 by the bridging element 40, is grounded the same as the other side of the battery and the other brush 41 of the motor 20. Thus when switch 34 is operated to connect terminal 33 to 36 and 35 to 39 by bridging elements 37 and 40 respectively, the magnet windings 26 and 35 and the motor winding 31 are energized. In response armature 25 is shifted longitudinally to connect terminals 28 and 29 by bridging contact 27 directly to connect the battery with the motor winding 31 to render the motor operative, while shifting of the armature 25 actuates lever 24 to shift pinion 23, now being rotated, into mesh with the flywheel 21 to start the engine.

The fluid pump 50 is driven by the electric motor 20 whenever it is operated. Said pump has a fluid inlet port 51 connected to the fluid reservoir 52 and a fluid discharge port 53 connected to the opening 54 of the fluid flow control device 55. Another opening 56 provided in the fluid flow control device is connectible to the fluid motor 57, shown in Fig. 1. This fluid motor is illustrated as of the cylinder-piston type, consisting of a cylinder 58 in which a piston 59 is reciprocative. Any suitable control valve 60 is provided in the line connecting one end of cylinder 58 with the fluid discharge opening 56 of the control device 55 and is operative to connect and disconnect said cylinder and discharge port. A spring 61 yieldably urges the piston 59 toward the end of the cylinder 58 into which fluid is introduced.

Control valve 60 is manually operated by a lever which also actuates a switch at the same time. This switch consists of a movable contactor 65 electrically connected to the motor field winding 31 and a stationary terminal 66 connected to the battery 38 and engageable by said contactor to close the circuit between the battery and motor field and thus render the motor active without causing the pinion 23 to be shifted into meshing engagement with the engine flywheel. When the switch is actuated from normal into terminal 66 engaging position, valve 60 is opened at the same time to connect the fluid motor cylinder 58 with the fluid pressure opening 56 so that fluid pressure in said cylinder moves the piston 59 against the effect of spring 61. Moving switch contactor 65 back to normal position as shown in Fig. 1, breaks the motor circuit and renders the motor inoperative and at the same time discontinues communication between the motor cylinder 58 and fluid discharge opening 56. Now fluid is trapped in cylinder 58 and thus piston 59 is held immovable therein. When the switch contactor 65 is moved from normal into the position 67, Fig. 1, then no electrical circuit is completed, however, the valve 60 is again actuated to complete communication between cylinder 58 and the discharge opening 56 so that the spring 61 may now move piston 59 to eject fluid from cylinder 58 through opening 56 into the reservoir 52.

The feature of this invention is the unitary control mechanism for establishing fluid flows between the fluid reservoir, pump and fluid cylinder so as to permit proper operation of the hydraulic system for actuating window lifting mechanism in the desired manner. This control mechanism is contained within a single housing 70 provided with an end cover 71. A plurality of interconnected fluid flow passages and spaces are provided within the housing 70. One passage 75 communicates at one end with a cylindrical passage or recess 76, the other end of passage 75 opening into an enlarged annular recess 77 into which a smaller diameter, annular core 78 extends. This recess 77 provides a container for the magnet winding 80 one end of which is grounded to the housing, the other end being connectible to the line leading from switch contactor 65 to the motor field 31 so that when switch contactor is moved into engagement with terminal 66 to complete the circuit between the battery 38 and the motor field 31, magnet winding 80 will also be brought into circuit connection with the battery. Core 78 extends into the magnet winding 80 and forms the magnetic core therefor. The passage 75 terminating in the end surface of the core 78 is counterbored to receive the annular valve seat 79. The cover 71 is interiorly shaped to form a space 81 providing communication between the valve seat 79 and the cylindrical recess 76.

A round, magnetic plug 85 with longitudinal grooves 86 in its peripheral surface is slidably supported in a sleeve fitted within the magnet winding 80 and forms the movable armature for said magnet winding. This plug supports a non-magnetic stem 87 coaxially thereof, the inner end of said stem being tapered and forming a valve movable into engagement with the seat 79 to shut off communication between passage 75 and the space 81 under certain circumstances. Communicating with passage 75 is the opening 54 in the housing which, as has been said, is in communication with the pump discharge port 53. An opening 88 shown in Figs. 1, 5 and 6 and opening 56, spaced from opening 88, lead from the recess 76 to the reservoir 52 and fluid motor cylinder 58 respectively. The reservoir 52, in the form of a can, is secured and sealed upon a disc like flange 89 formed on the housing 70. A pipe 90 extends into the reservoir and is connectible with the intake port 51 of the pump 50 so that said pump may withdraw fluid from said reservoir. A similar pipe 91 extends into the reservoir and communicates with the opening 88.

At the end of recess 76 opening into the space 81 there is inserted a cylindrical sleeve 95 forming the cylinder in which the piston 96 provided with suitable venting orifices reciprocates. This piston has a stem 97 extending coaxially therefrom which is slidably supported in a centrally apertured collar 98 held between the inner end of sleeve 95 and a shoulder in recess 76. Washers 99 are carried by stem 97 and form an adjustable abutment for one end of spring 100. The other end of spring 100 engages the sleeve member 101, forming one part of the two-way acting control valve in recess 76, and yieldably holds said sleeve 101 against a shoulder at this end of the recess. Sleeve 101 has an inwardly extending annular flange 102 forming a seat for the ball 103, another member of the two-way valve. Movement of the ball from seat 102 is normally limited by the shoulder in the housing at the point of juncture of recess 76 with passage 75.

When the motor 20 is activated to crank the engine motor, pump 50 is also driven and thus will draw fluid from the reservoir and deliver it under pressure through opening 54 in the control device 55 into passage 75. Inasmuch as the fluid motor control valve has not been opened in this instance, the fluid pressure flow into passage 75 cannot be delivered to said fluid motor and thus must be directed in another direction inasmuch as it is stopped by valve 101—103. Fluid pressure in passage 75 under these circumstances is directed through the valve seat 79 against valve 87 and will move the valve 87 and its supporting armature block 85 into the position as shown in Fig. 2 in which fluid flows from seat 79 through the longitudinal grooves 86 in the armature block 85 into space 81 to be directed against the piston 96. In response to the fluid pressure against the piston 96 said piston and its stem 97 will be moved so that stem 97 will approach and engage ball 103 to move it from its annular seat 101 in the sleeve portion 102 of this valve mechanism and thereby open an escape passage through said sleeve portion of the valve into the recess 76 and from there into the opening 88 connected with the reservoir 52 by pipe 91. Fig. 5 shows the mechanism in this control position. Fluid will not flow through opening 56 inasmuch as valve 60 is closed at this time. Thus, while the pump is being driven by the electric motor 20 acting as an engine cranking device, fluid delivered under pressure by the pump is directed against piston 96 to move it into and hold it in the sleeve 102 opening position as shown in Fig. 5, the fluid under pressure is sufficient for being circulated from the pump, through passage 75, valve 102, recess 76, opening 88 and pipe 91 back to the reservoir from which the fluid was first drawn by the pump.

When the electric motor 20 is to be operated for window adjustment purposes only and not as an engine cranking medium, switch contactor 65 is actuated to engage terminal 66 at the same time valve 60 is opened to complete communication between the outlet 56 and the fluid motor cylinder 58. Now the motor 20 is activated to drive the pump only and the magnet winding 80 is connected in circuit with the battery to be energized thereby. The energized magnet winding 80 will cause the armature block 85 to move inwardly so that the valve 87 in said block will engage and close the seat 79, thereby shutting off communication between the pump fluid pressure passage 75 and the space 81 to which piston 96 is exposed. Fluid pressure in passage 75 is now directed against and moves valves 103—101 as a unit toward stem 97 and thus normally positions said stem 97 and its vented piston 96 in recess 76 and as the sleeve 102 moves in said recess it will open communication between passage 75 and opening 56 to direct the fluid pressure through the now open valve 60 to the fluid motor cylinder 58, said fluid pressure forcing the piston 59 from its position in the cylinder toward the opposite end of said cylinder against the opposition by spring 61. The piston, being connected by its rod and associated levers, not shown, with the vehicle window to be operated, will by its movement by fluid pressure adjust said window. When the desired adjustment of the window is completed, valve 60 and contactor 65 are again actuated to close communication between the pump and fluid motor and to break the circuit to the electric motor 20 and the electromagnet winding 80, thereby rendering said electric motor inoperative to stop pump operation and to deenergize the winding 80. The fluid motor will be held in the adjusted position due to the trapping of the fluid therein by the closing of valve 60.

In case of excessive pressure in passage 75 or when the pump operation is maintained after the fluid motor piston 59 has been moved into its extreme pressure actuated position, valve 101—103 will be moved as a unit further into recess 76 until the ball 103 pushes the stem 97 and its piston into the extreme normal position thereby halting its further movement in this direction as shown in Fig. 6. The fluid pressure will, however continue to move the sleeve 101 relatively to the stalled ball 103, thereby moving the seat 102 away from the ball and thus opening an escape passage for the fluid through sleeve 101 into recess 76 and through opening 88 and pipe 91 into the reservoir. This relieves the excessive fluid pressure and thus avoids possible damage thereby.

While the embodiment of the present invention as herein disclosed, constitutes a preferred form, it is to be understood that other forms might be adopted.

What is claimed is as follows:

1. A fluid flow control device consisting of a housing in which is provided a passage with which a fluid pressure discharge port of a pump, a connection with a fluid reservoir and a connection with a fluid actuated motor all communicate; double acting valve means in said passage normally shutting off communication between the pump port and both the motor and fluid reservoir; actuator means in the passage operative out of normal position by fluid pressure to engage and actuate the double acting valve means for opening communication between the pump port and the reservoir; a normally open control valve in the passage between the pump port and said actuator means, said control valve being operative out of normal position to shut off communication between the pump port and said actuator means rendering it inactive, at which time fluid pressure from the pump port is directed against and actuates said double acting valve means concurrently to open communication between the pump port and the motor and to close the passage to shut off communication between the reservoir and the motor; and means in the housing for actuating the control valve.

2. A device in accordance with claim 1, in which the double acting valve means is movable, by excessive fluid pressure from the pump port, to engage the actuator means and be operated thereby for connecting the pump port with the reservoir.

3. A fluid flow control device connected to a fluid reservoir, a fluid pressure pump and a fluid actuated motor, said device consisting of a housing providing interconnected fluid flow passages in communication with the reservoir, pump and motor; a check valve in one of the passages normally shutting off communication between the pump pressure passage and both the reservoir and motor and maintaining communication between the motor and reservoir; means in said check valve passage, operative by fluid pressure to engage and actuate said check valve for opening communication between the pump pressure passage and said reservoir; a control valve in another passage, normally maintaining said passage open to provide communication between the pump pressure passage and said means; and an electromagnet in said housing, operative, when energized, to close said control valve to discontinue the communication between the pump pressure passage and said means, whereby the check valve is actuated by fluid pressure in said pump pressure passage to connect the pump pressure with the motor and to disconnect the pump pressure from the reservoir.

4. A fluid flow control device adapted to be connected to a fluid reservoir, a fluid pressure pump and a fluid actuated motor, said device consisting of a housing providing interconnected fluid flow passages one of which is a pump pressure passage communicating with the pressure side of the pump and another of which communicates with both the fluid reservoir and the fluid motor; a normally closed two way valve normally shutting off communication between the pump pressure passage and the said other passage; pressure operative means in said other passage engageable with the two way valve for actuating it one way to open communication between the pump pressure passage and the reservoir; a control valve normally open to complete communication between the pump pressure passage and the pressure operative means; and an electromagnet operative to close said control valve whereby fluid pressure in said pump pressure passage actuates the two way valve the other way to open communication between the pump pressure passage and the motor and to close communication between the motor and the reservoir.

5. A fluid flow control device connected to a fluid reservoir, to a fluid pressure pump and to a fluid pressure actuated motor, respectively, said device consisting of a housing providing interconnected passages one of which forms a pump pressure passage, with which the fluid motor and a discharge pipe to the reservoir communicate; a two-way check valve in one of the passages, normally shutting off communication between the pump pressure passage and the fluid motor and maintaining communication between said motor and the discharge pipe to the reservoir; means in said one of the passages, normally subjected to fluid pump pressure and operative thereby to engage and actuate the two-way valve in one direction for opening communication between the pump pressure passage and the reservoir discharge pipe; a normally open shut-off valve between the pump pressure passage and said means; an electromagnetic coil in the housing operative, when energized, to close the shut-off valve whereby communication between the pump pressure passage and said means is discontinued and fluid pressure actuates the two-way valve in the other direction for establishing communication between the pump pressure passage and the fluid motor and discontinuing communication between the said motor and the reservoir discharge pipes.

6. A device in accordance with claim 4 in which the two-way check valve is movable into engagement with the said pressure operative means and operated thereby to open communication between the pump pressure passage and the reservoir discharge pipe in response to a predetermined excessive fluid pressure in the pump pressure passage.

7. A fluid flow control device consisting of a housing having a cylindrical recess with which pipe connections from a fluid reservoir and from a fluid actuated motor communicate, a passage communicating with one end of said recess, the discharge pipe of a fluid pressure pump being connected with said passage, and a space providing communication between the said passage and the other end of the cylindrical recess; a two-way check valve in the recess, said check valve consisting of a sleeve slidable in the recess and providing an inner, annular seat engaged by a ball to close the sleeve; a vented piston slidable in said cylindrical recess, said piston having a stem extending toward the two-way check valve; a spring engaging the check valve sleeve and normally urging it against a stop at one end of said cylindrical recess, the communicating openings to the reservoir and pump coming between the normally positioned piston and said two-way check valve; an armature in said space, carrying a valve operative by the armature to shut off communication between the said passage and the space; and an electromagnet coil in said space operative, when energized, to actuate the armature for closing said passage.

8. A fluid flow control device connected to a fluid reservoir, to a fluid pressure pump and a fluid actuated motor, said device consisting of a unitary housing providing interconnected fluid passages in communication with the reservoir, pump and motor; a compound check valve in one of the passages normally shutting off communication between the pump and the motor and reservoir while maintaining communication between the said motor and reservoir; means in said one passage operative by fluid pressure to engage and adjust said compound check valve for opening communication between the pump and fluid reservoir; a control valve normally maintaining communication between the pump and said means for rendering said means operative by fluid pressure; an electromagnet in the housing operative, when energized, to move the control valve to shut off communication between the pump and said means, in response to which fluid pressure from the pump actuates the first mentioned check valve to open communication between the pump and motor and close communication between the pump and fluid reservoir, said compound check valve being operative by a predetermined increase in pump fluid pressure to engage said means and be adjusted thereby to open communication between the pump and the reservoir.

DE LOSS D. WALLACE.
WILLIAM F. ERICKSON.

REFERENCES CITED

The following references are of record in the file of this patent:

UNITED STATES PATENTS

| Number | Name | Date |
|---|---|---|
| 2,139,473 | Sessions | Dec. 6, 1938 |
| 2,425,391 | Parsons | Aug. 12, 1947 |